Jan. 6, 1953  J. B. McLEAN  2,624,290
PROPELLING SYSTEM FOR LOCOMOTIVES AND OTHER VEHICLES
Filed Aug. 4, 1948  2 SHEETS—SHEET 1
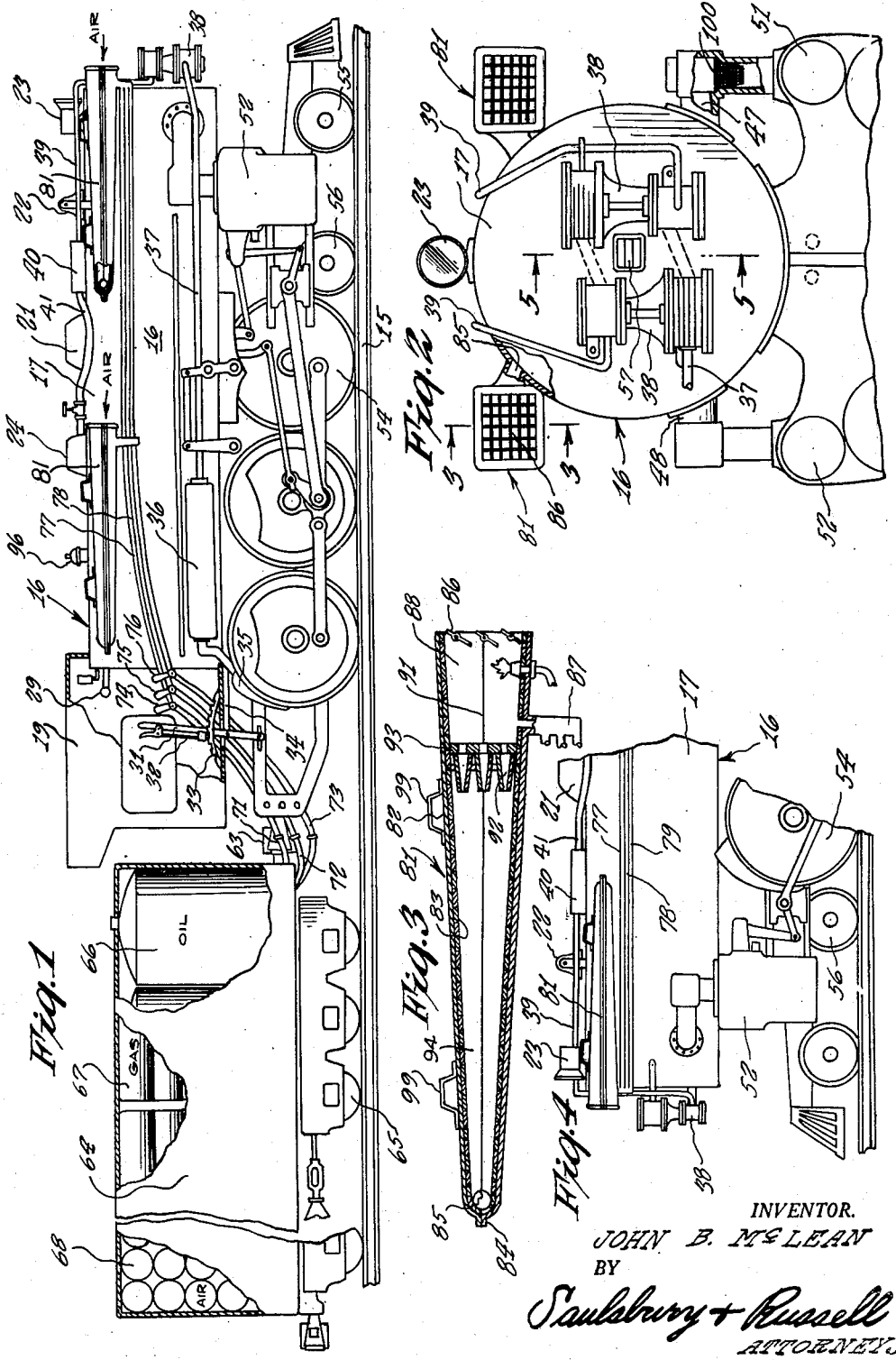
INVENTOR.
JOHN B. McLEAN
BY
Saulsbury + Russell
ATTORNEYS Jan. 6, 1953   J. B. McLEAN   2,624,290
PROPELLING SYSTEM FOR LOCOMOTIVES AND OTHER VEHICLES
Filed Aug. 4, 1948   2 SHEETS—SHEET 2
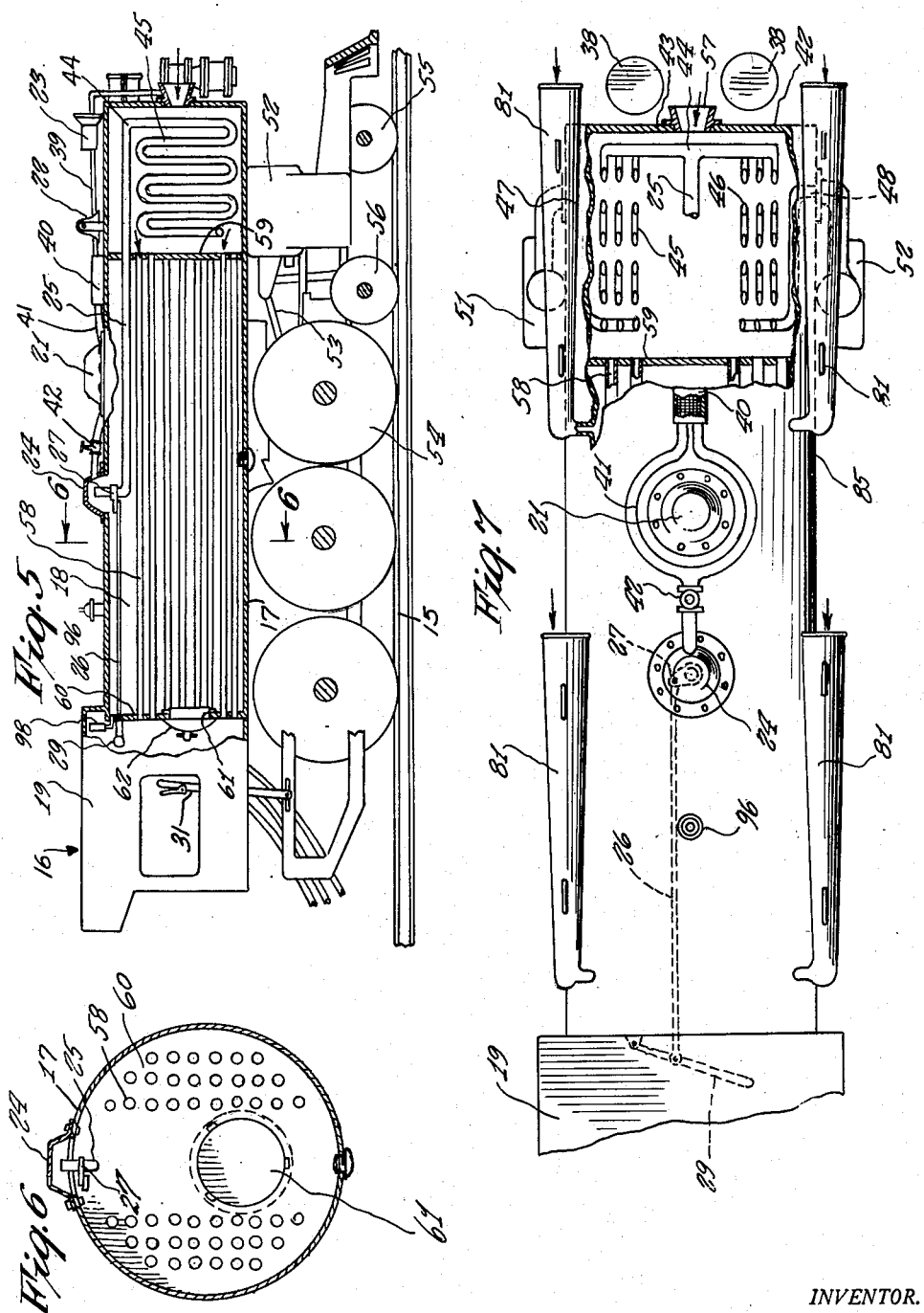
INVENTOR.
JOHN B. McLEAN
BY
Saulsbury & Russell
ATTORNEYS Patented Jan. 6, 1953

2,624,290

UNITED STATES PATENT OFFICE 2,624,290

PROPELLING SYSTEM FOR LOCOMOTIVES AND OTHER VEHICLES

John B. McLean, Yonkers, N. Y.

Application August 4, 1948, Serial No. 42,457

7 Claims. (Cl. 105—62)

1

This invention relates to a propelling system for locomotives and other vehicles.

It is an object of the present invention to provide a propelling system for locomotives and the like vehicles which requires no steam boiler, requires no coal and eliminates the use of a fire box, provides pressure for effecting the operation of the usual auxiliary equipment, wherein smoke will be eliminated and wherein the movement of the locomotive or vehicle is utilized to accumulate air for the compressing of gases created by burners and wherein the hot gases and air accumulated expand to place the mixture under high pressure within a reservoir serving to collect the same and wherein also the air resulting from the movement of the vehicle will serve to effectively cool the mixture and condition it for use in the operating cylinders of the locomotive or vehicle and for use in driving the auxiliary pumps and other equipment.

Other objects of the present invention are to provide a fireless locomotive or the like vehicle requiring no water or steam, which is of simple construction, reduces cost of building locomotives, easy to maintain, makes unnecessary the cleaning of boiler tubes, utilizes free air, and efficient in operation.

For other objects and for a better understanding of the invention, reference may be had to the following detailed description taken in connection with the accompanying drawings, in which Fig. 1 is a side elevational view of the locomotive embodying the features of the present invention with portions of the cab and tender broken away to show the interior thereof.

Fig. 2 is a fragmentary front elevational view of the locomotive.

Fig. 3 is a longitudinal sectional view of one of the converters, the view being taken on line 3—3 of Fig. 2.

Fig. 4 is a fragmentary side elevational view of the front end of the locomotive looking at the opposite side of the same from that shown in Fig. 1 to show the converter mounted on that side of the locomotive.

Fig. 5 is a fragmentary and longitudinal sectional view taken through the main reservoir of the locomotive and generally on line 5—5 of Fig. 2.

Fig. 6 is a transverse sectional view taken through the reservoir and on line 6—6 of Fig. 5.

Fig. 7 is an enlarged top plan view of the locomotive with a portion at the front being broken away to show the interior front cooling compartment.

2

Referring now to the figures, 15 represents a track on which locomotive 16 embodying the features of the present invention may travel. The locomotive is generally of the same shape as the usual steam locomotives except that its main cylindrical casing 17 is a reservoir for compressed air and gas rather than a boiler. This reservoir is indicated at 18. In rear of the main cylindrical part 17 of the locomotive is engineer's cab 19 and upon top of the main casing 17 is a sand dome 21, a bell 22 and a forward head light 23. Also according to the present invention, there is provided a pressure dome 24 into which an outlet pipe 25, Fig. 5, extends for the collection of the high pressure gas and air mixture within the reservoir 18.

A control rod 26 extends from a valve 27 in the outlet pipe 25 and more particularly in its upwardly extending bent end 28 which extends upwardly into the dome 24 to receive the gas and air mixture at the high collecting point within the dome, to engineer's cab 19, Fig. 7, where there is a lever 29 for effecting the movement of the rod 26. By the movement of the lever 29, the high pressure gases are throttled to the outlet pipe 25. Also accessible to the engineer is a brake lever 31 having a detent latch device 32 and operable over a quadrant 33. The lever 31, Fig. 1, is connected by a rod 34 with pressure operated brake devices 35 receiving compressed air from a tank 36 mounted on the side of the locomotive and supplied through pipe 37 with compressed air from air pumps 38 operated from the compressed gases and air in the main reservoir 18. Pumps 38 are connected by pipes 39 with a filter 40 which is in turn connected by pipes 41, surrounding sand dome 21, with valve fitting 42 on pressure dome 24. The pumps are mounted on front plate 43 of the main casing 17, Fig. 2.

The outlet pipe 25 terminates in a manifold 44 to which are connected coil groups 45 and 46 Fig. 7 which supply respectively cold gas under pressure through their outlets 47 and 48, respectively, to gas chests 51 and 52 respectively which operate drive rods 53 connected with drive wheels 54 in the usual manner. Small wheel trucks 55 and 56 support the forward part of the engine.

The front plate 43 has an air opening 57 through which cooling air enters for passage over the coil groups 45 and 46 and through cooling air tubes 58 secured between front and rear headers 59 and 60 of the reservoir 18 whereby the gas and air mixture collected within the reservoir 18 may be cooled and maintained at a low temperature. The coil groups 45 and 46 further condition the gas and air mixture on leaving the reservoir for use in the gas chests 51 and 52 so that they will not become over heated by the gas and air mixture that is used to operate them.

In the rear header 60 is a manhole 61 over which is extended a man hole cover 62. Access can be had to the reservoir 18 by the removal of the manhole cover 62 so that at any time, the interior of the reservoir and the air tubes therein may be inspected. To provide access to the chamber housing the coil groups 45 and 46, a manhole may be made in front header 59.

Through a coupling 63, a tender 64 is connected to the locomotive cab 19. This tender is supported on wheel trucks 65 and carries oil tanks 66, compressed fuel gas tanks 67, and compressed air tanks 68.

The oil, gas and air are respectively supplied through pipe connections 71, 72 and 73 connected respectively with control valves 74, 75 and 76 accessible to the engineer in the cab 19. Extending from the valves and running along the sides of the reservoir are pipes 77, 78 and 79 for supplying oil, gas and air to converters 81 mounted on the sides of the reservoir 18. There are four of these converters, two on each side of the reservoir and since each converter is of the same construction, description thereof will be directed to but one of these converters, but it will be understood that such description may apply to the other converters.

The converters 81 on each side of the reservoir are disposed one behind the other, each converter 81 comprises a long tapered casing 82, Fig. 3, lined with a fire resistant material 83 and having at its closed and small end 84 an outlet 85 leading into the reservoir 18. Across the front end of the casing 82 is a shutter arrangement 86 having butterfly shutters or louvers which tend to open automatically as the locomotive starts in motion and air pressure is brought to bear on their front faces. As the locomotive slows down, the louvers will automatically close to prevent gas leakage.

The pipes 77, 78 and 79 connect with a manifold 87 serving as a mixing chamber in which gas or oil and compressed air are conditioned for burning. The manifold 87 connects with the bottom of the casing 82 to deliver the mixed fuel and air to a forward space or combustion chamber 88 in rear of the shutters 86. A gas pilot flame 91 burns at all times and the mixture will be kept ignited. The products of combustion under the blast of free air entering the open end of the converter and the sweeping action thereof will at first be directed through a collection of small tapered nozzles 92 supported in a partition wall 93 where they are collected in a rear space 94 for expansion and delivery through the outlet 85 to the reservoir 18. The nozzle openings are small at their outlet ends and such that the gas products and air collected in the chamber 94 cannot readily escape in large quantities forwardly when the locomotive is not in motion. As long as the locomotive is in motion, free air entering space 88 will maintain sufficient pressure through the tapered nozzles 92 to prevent the escape of the gases. If desired, valves may be disposed in the outlet 85 of each converter to prevent the escape of the gases from the reservoir when the locomotive is no longer in motion. A safety valve 96 is provided on the reservoir 18 to discharge the gases from the reservoir when a predetermined too high pressure is reached in the reservoir. Within the reservoir there will be collected an accumulation of the air and gases and the pressure of these gases is built up as a result of the heat supplied to the incoming gases by the flames. The bottled gas and compressed air are used to start the operation of the converter. When sufficient heat has been generated in the converter, the oil can be substituted for the gas as the fuel and the free air entering the open end of the converter can be substituted for the compressed air. As a result of the combustion in the confined space and of the blast of free air entering the converter coupled with the heat expansion of the gas and air, the mixture of the gas products and free air will be placed under high pressure and will enter the reservoir 18. The products of combustion include the hydrocarbon gases resulting from the burning of the ordinary fuel oil and water gas.

With the reservoir 18 filled with this mixture of gas products and free air, the mixture may be utilized in the manner as previously described to effect the motion of the locomotive and to effect the operation of the various auxiliary devices. Adequate control is had of reservoir and the gas, oil and air supply from within the cab 19 and in order that the engineer may know the pressure of the gases within the reservoir a pressure gauge 98 is provided on the rear header 60.

The converters are preferably formed of upper and lower parts separable from one another in order that repair of the converters can be effected easily and readily. Handles 99 are provided on the upper part to facilitate the removal of the same.

It will be apparent that any number of converters 81 can be disposed on the locomotive and that they may be placed at different locations than that shown. A strainer 100, Fig. 2, is disposed in the supply outlets 47 and 48 to be certain that the mixture when delivered to the chests will be clean and free of solid particles.

While various changes may be made in the detail construction, it shall be understood that such changes shall be within the spirit and scope of the present invention as defined by the appended claims.

I claim:

1. In a locomotive or the like vehicle, a propelling system comprising a tapered combustion products generator formed of a casing adapted to collect air and products of combustion, a burner connected to the casing adjacent its forward end, the forward end of the generator casing being open to receive a blast of free air when the locomotive is in motion, an automatic shutter arrangement in the forward end of the generator adapted to open under the action of air due to the motion of the vehicle to control the flow of air to the generator, a reservoir connected to the rear end of the generator to receive the mixture of the products of combustion air upon the same expanding and under the pressure of air entering the open forward end of the generator, said locomotive having a driving mechanism including a gas mixture receiving chest and an expansion engine, an outlet pipe extending from the reservoir to the chest, and valve means in the outlet pipe for controlling the flow of the mixture from the reservoir, and controlled means for supplying fuel gas, oil and compressed air to the burner.

2. In a locomotive or the like vehicle, a propelling system comprising a combustion products generator formed of a casing adapted to collect air and products of combustion, a burner connected to the casing adjacent its forward end, the forward end of the generator casing being open to receive a blast of free air when the locomotive is in motion, an automatic shutter arrangement in the forward end of the generator adapted to open under the action of air due to the motion of the vehicle to control the flow of air to the generator, a reservoir connected to the generator to receive the mixture of products of combustion and air upon the same expanding and under the pressure of air entering the open end of the generator, said locomotive having a driving mechanism including a gas mixture receiving chest and an expansion engine, an outlet pipe extending from the reservoir to the chest, and valve means in the outlet pipe for controlling the flow of the mixture from the reservoir, gas, compressed air and oil supply receptacles, hose connections extending from the receptacles to the burner on the generator to be burned and produce products of combustion, each of said hose connections having valve elements for controlling the flow of the respective fluids from their receptacles.

3. In a locomotive or the like vehicle, a propelling system comprising a combustion products generator formed of a casing adapted to collect air and products of combustion, a burner connected to the casing adjacent its forward end, the forward end of the generator casing being open to receive a blast of free air when the locomotive is in motion, an automatic shutter arrangement in the forward end of the generator adapted to open under the action of air due to the motion of the vehicle to control the flow of air to the generator, a reservoir connected to the generator to receive the products of combustion upon the same expanding and under the pressure of air entering the open end of the generator, said locomotive having a driving mechanism including a gas mixture receiving chest and expansion engine, an outlet pipe extending from the reservoir to the chest, and valve means in the outlet pipe for controlling the flow of the gases from the reservoir, a cooling chamber provided on the locomotive ahead of the reservoir and adapted to receive air under pressure from the atmosphere when the locomotive is in motion, said outlet pipe including a coil disposed in the chamber to be cooled by the air passing therethrough and before the mixture of the products and air is extended to the chest of the operating mechanism and controlled means for separately supplying fuel gas, oil and compressed air to the burner.

4. In a locomotive or the like vehicle, a propelling system comprising a combustion products generator formed of a casing adapted to collect air and products of combustion, a burner connected to the casing adjacent its forward end, the forward end of the generator casing being open to receive a blast of free air when the locomotive is in motion, an automatic shutter arrangement in the forward end of the generator adapted to open under the action of air due to the motion of the vehicle to control the flow of air to the generator, a reservoir connected to the generator to receive the products of combustion upon the same expanding and under the pressure of air entering the open end of the generator, said locomotive having a driving mechanism including a gas mixture receiving chest and expansion engine, an outlet pipe extending from the reservoir to the chest, and valve means in the outlet pipe for controlling the flow of the mixture of products of combustion and air from the reservoir, said reservoir having front and rear headers, air tubes extending between the headers and adapted to receive air from the atmosphere as the locomotive is in motion to cool the mixture within the reservoir and controlld means for separately supplying fuel gas, oil and compressed air to the burner.

5. In a locomotive or the like vehicle, a propelling system comprising a converter formed of a casing adapted to collect air, a burner connected to the casing adjacent its forward end, the forward end of the converter casing being open to receive a blast of free air when the locomotive is in motion, an automatic shutter arrangement in the forward end of the generator adapted to open under the action of air due to the motion of the vehicle to control the flow of air to the generator, a reservoir connected to the converter to receive the mixture of the products of combustion and air upon the same expanding and under the pressure of air entering the open end of the converter, said locomotive having a driving mechanism including an air chest, an outlet pipe extending from the reservoir to the chest, and valve means in the outlet pipe for controlling the flow of the gases from the reservoir, a cooling chamber provided on the locomotive ahead of the reservoir and adapted to receive air under pressure from the atmosphere, said outlet pipe including a coil disposed in the chamber to be cooled by the air passing therethrough and before the mixture is conducted to the chest of the operating mechanism, said air chamber being disposed ahead of the reservoir, said reservoir having front and rear headers, air tubes extending between the headers, and said air tubes being adapted to receive air from the cooling chamber to effect the cooling of the gases within the reservoir and controlled means for supplying fuel gas, oil and compressed air to the burner.

6. A pressure supply system for vehicles comprising a combustion products generator of tapered formation having a small outlet end and a large opening in the forward end adapted to receive a blast of sweeping air when the vehicle is in motion, a burner arrangement operable in the forward end of the generator to supply its products of combustion to the outlet end of the generator, an apertured partition within the generator down stream of said burner arrangement through which the products of combustion under the sweeping action of air entering the large opening in the forward end of the generator are forced into the outlet end of the generator, a reservoir connected to the generator to receive the mixture of products of combustion and air and to retain them for use on the vehicle, said apertured partition comprising a partition wall and a plurality of tapered nozzles mounted in the partition wall with small ends extending toward the small outlet end of the generator and an automatic shutter arrangement in the forward end of the generator adapted to open under the action of air due to the motion of the vehicle and to admit air to the generator.

7. A pressure supply system for vehicles comprising a combustion products generator of tapered formation having a small outlet end and a large opening in the forward end adapted to receive a blast of sweeping air when the vehicle is in motion, a burner arrangement operable in the forward end of the generator to supply its products of combustion to the outlet end of the generator, an apertured partition within the generator down stream of said burner arrangement through which the products of combustion enter the outlet end of the generator, a reservoir connected to the generator to receive the mixture of the products of combustion and air and to retain them for use on the vehicle, and an automatic shutter arrangement in the forward end of the generator adapted to open under the action of air due to the motion of the vehicle to admit air to the generator.

JOHN B. McLEAN.

REFERENCES CITED

The following references are of record in the file of this patent:

UNITED STATES PATENTS

| Number | Name | Date |
|---|---|---|
| 732,908 | Thomson | July 7, 1903 |
| 774,778 | Pratt | Nov. 15, 1904 |
| 970,389 | Pendleton | Sept. 13, 1910 |
| 1,001,703 | Stucki | Aug. 29, 1911 |
| 1,016,602 | Baker | Feb. 6, 1912 |
| 1,158,814 | Larison et al. | Nov. 2, 1915 |
| 1,346,509 | Olhovsky | July 13, 1920 |
| 1,375,601 | Morize | Apr. 19, 1921 |
| 1,537,642 | Laffey | May 12, 1925 |
| 1,983,405 | Schmidt | Dec. 4, 1934 |
| 2,096,184 | Lasley | Oct. 19, 1937 |
| 2,480,626 | Bodine | Aug. 30, 1949 |
| 2,496,351 | Mazzoni | Feb. 7, 1950 |

FOREIGN PATENTS

| Number | Country | Date |
|---|---|---|
| 517,894 | France | Dec. 23, 1920 |
| 545,444 | France | July 20, 1922 |
| 417,975 | Germany | Aug. 24, 1925 |
| 215,603 | Great Britain | May 15, 1924 |
| 223,797 | Great Britain | Oct. 30, 1924 |